United States Patent
Brown et al.

(10) Patent No.: US 10,742,761 B2
(45) Date of Patent: Aug. 11, 2020

(54) INTER-PROCESS COMMUNICATION FAULT DETECTION AND RECOVERY SYSTEM

(71) Applicant: Dell Products L.P., Round Rock, TX (US)

(72) Inventors: Michael Emery Brown, Austin, TX (US); Santosh Kumar Bidaralli, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 15/949,454

(22) Filed: Apr. 10, 2018

(65) Prior Publication Data

US 2019/0312947 A1 Oct. 10, 2019

(51) Int. Cl.
| | | |
|---|---|---|
| G06F 11/00 | (2006.01) | |
| H04L 29/08 | (2006.01) | |
| G06F 9/54 | (2006.01) | |
| G06F 11/07 | (2006.01) | |
| H04L 12/26 | (2006.01) | |

(52) U.S. Cl.
CPC .......... *H04L 67/2809* (2013.01); *G06F 9/547* (2013.01); *G06F 11/0709* (2013.01); *G06F 11/0757* (2013.01); *G06F 11/0793* (2013.01); *H04L 43/10* (2013.01); *H04L 67/10* (2013.01)

(58) Field of Classification Search
CPC ............. G06F 11/0709; G06F 11/0757; G06F 11/0793
See application file for complete search history.

(56) References Cited

U.S. PATENT DOCUMENTS

| | | | | |
|---|---|---|---|---|
| 6,405,262 B1* | 6/2002 | Vogel | ........................ | G06F 9/54 709/203 |
| 2002/0111996 A1* | 8/2002 | Jones | .................. | H04L 63/0428 709/203 |
| 2003/0191795 A1* | 10/2003 | Bernardin | ............... | G06F 9/505 718/105 |
| 2012/0174119 A1* | 7/2012 | Van Vechten | ........... | G06F 9/547 719/313 |
| 2019/0349449 A1* | 11/2019 | Shribman | ........... | H04L 67/2838 |

* cited by examiner

*Primary Examiner* — Katherine Lin
(74) *Attorney, Agent, or Firm* — Haynes and Boone, LLP

(57) ABSTRACT

An inter-process communication (IPC) system, includes a first client engine, a first server engine, and a broker engine that is coupled to the first client engine. The broker engine initiates a first timer that is configured to reset when traffic is received from the first server engine while the first server engine is registered with the broker engine and coupled to the broker engine via a communication channel. The traffic that causes the first timer to reset includes at least one of: traffic generated by the first client engine to complete a request, and a first server-to-broker heartbeat message generated by the first server engine. The broker engine determines that the first timer has reached a predefined time amount, and in response, removes the registration of the first server engine and removes the communication channel between the broker engine and the first server engine.

14 Claims, 8 Drawing Sheets

INTER-PROCESS COMMUNICATION FAULT DETECTION AND RECOVERY SYSTEM

BACKGROUND

The present disclosure relates generally to information handling systems, and more particularly to fault detection and recovery of broker and server processes provided on information handling system(s) that are included in an inter-process communication system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an Operating System (OS) provided on an information handling system, or between information handling systems on a network, application processes may communicate using Inter-Process Communication (IPC) such as, for example, Remote Procedure Calls (RPC). Typically, applications or application processes categorized as clients and servers may use IPC where the client requests data or functions and the server responds to the client requests. An IPC system may also include a broker that provides a routing process that routes calls from the clients to the servers. Typically, servers in the IPC system will "register" themselves with the broker, and the broker then establishes a communication channel with the registered servers. Such IPC system operations introduce a plurality of directional channels that have the potential to have faults. For examples, faults may occur with a request from the client to the broker, the request from the broker to the server, a response from the server to the broker, and the response from the broker to the client. Furthermore, the servers may utilize a sideband channel to communicate and register with the broker and/or perform other administrative functions, which provides additional channels that may have faults: a sideband channel between the server and the broker, and a sideband channel between the broker and the server. When any of these channels has a fault, the entire IPC system may be affected and result in the blocking, delaying, or dropping of messages from many clients to many servers. For instance, if a server connection to the broker has an issue, then many clients may time out while trying to request services from that server. Further still, there are several layers to detect if there is an issue with a channel between the broker and the server, and several fault conditions that can impact the ability of the IPC system to provide service.

Accordingly, it would be desirable to provide improved IPC fault detection and recovery system.

SUMMARY

According to one embodiment, an information handling system (IHS) includes a communication system; a processing system coupled to the communication system; and a memory system coupled to the processing system and including instruction that, when executed by the processing system, cause the processing system to provide a broker engine that is configured to: initiate a first timer that is configured to reset when traffic is received from a first server engine while the first server engine is registered with the broker engine and coupled to the broker engine via a communication channel provided by the communication system, wherein the traffic that causes the first timer to reset includes at least one of: traffic generated by the first client engine to complete a request, and a first server-to-broker heartbeat message generated by the first server engine; and determine that the first timer has reached a predefined time amount, and in response, remove the registration of the first server engine and remove the communication channel between the broker engine and the first server engine.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
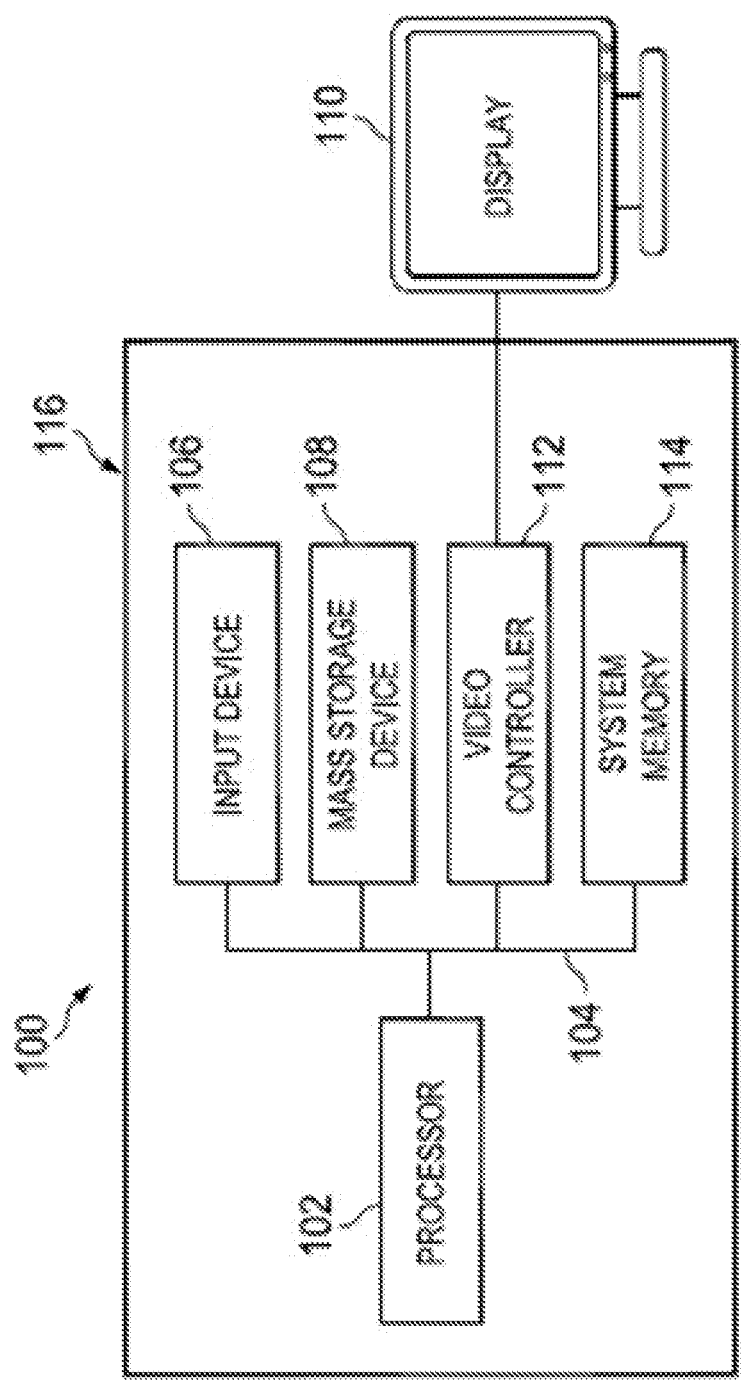
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
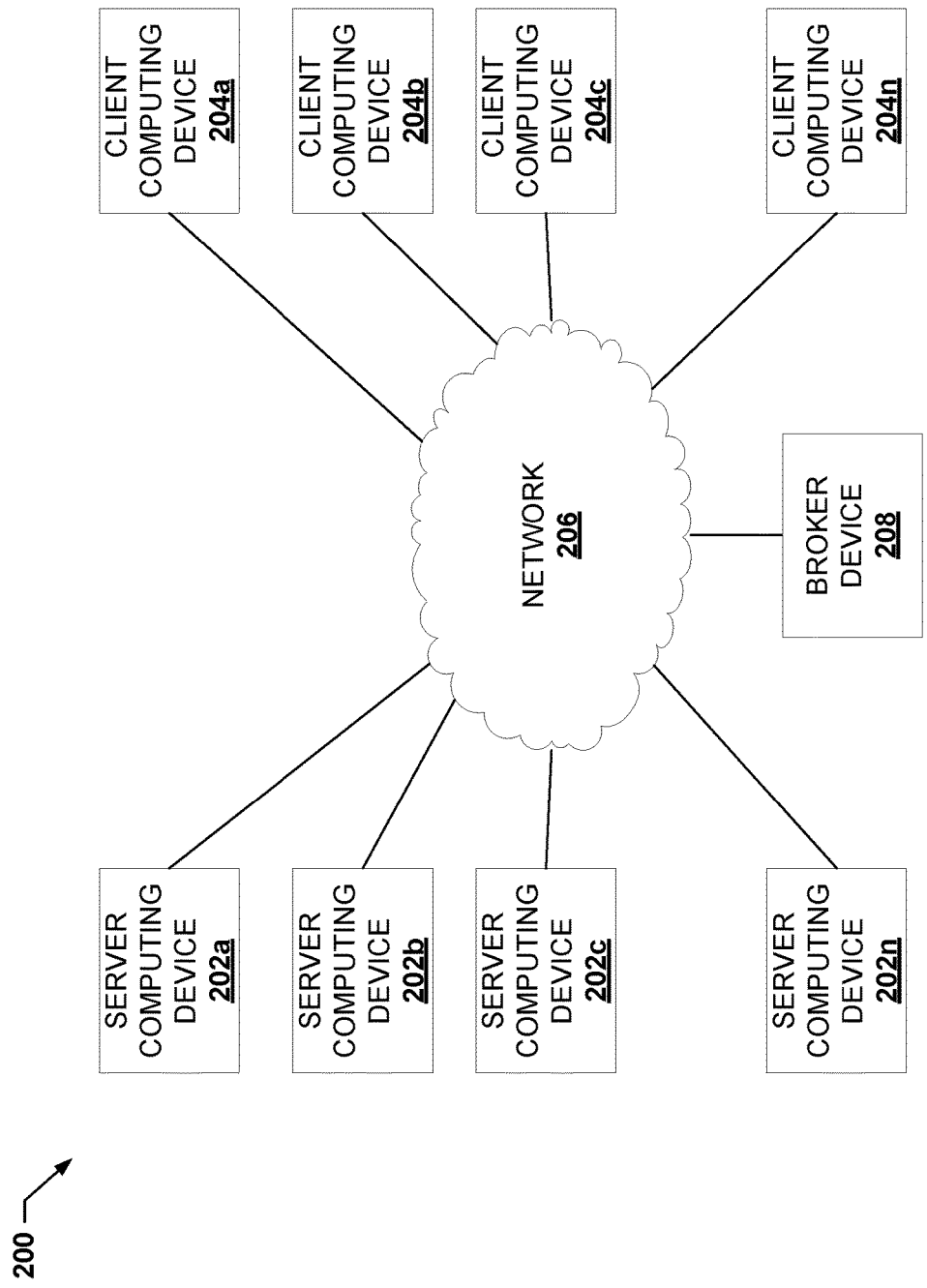
FIG. 2 is a schematic view illustrating an embodiment of an Inter-Process Communication (IPC) system provided by a network of computing devices.

Referring now to FIG. 2, an embodiment of an Inter-Process Communication (IPC) system 200 is illustrated. While the embodiment illustrated in FIG. 2 provides an example of a use of the IPC system 200 of the present disclosure in supporting requests and responses between client processes and server processes in the IPC system 200, as well as fault detection and recovery of server processes and/or a broker process that routes calls from the client processes to the server processes, one of skill in the art in possession of the present disclosure will recognize that IPC system 200 may be provided for a different numbers of devices, a variety of different types of devices, and a variety of different configurations of devices (e.g., different IPC configuration topologies), while remaining within the scope of the present disclosure. In the illustrated embodiment, the IPC system 200 includes one or more server computing devices 202a, 202b, 202c, and up to 202n, any of all of which may be provided by the IHS 100 discussed above with reference to FIG. 1, and/or may include some or all of the components of the IHS 100. However, one of skill in the art will recognize that the server computing devices 202a-202n may be provided by other computing devices (e.g., desktop computing device(s), laptop/notebook computing device(s), tablet computing device(s), mobile phone(s), etc.) while remaining within the scope of the present disclosure.

Each of the server computing devices 202a-202n may host and/or otherwise provide for the execution of one or more applications (e.g., an application for completing transactions, web chat communication applications, debugging applications, video encoding applications, e-mail applications, social media applications, customer support applications, reservation booking applications, order management applications, manufacturing applications, order fulfillment and management applications, shipping applications, and/or other applications that would be apparent to one of skill in the art in possession of the present disclosure) whose processes utilize IPCs for facilitating communications and data sharing between the processes of the one or more application(s) such as, for example, Remote Procedure Call (RPC) communications, clipboard communications, data copy communications, Dynamic Data Exchange (DDE) communications, file mapping communications, mailslots communications, pipes communications, WINDOWS® sockets communications, and other IPCs that would be apparent to one of skill in the art in possession of the present disclosure.

The IPC system 200 also includes one or more client computing devices 204a, 204b, 204c, and up to 204n, any of all of which may be provided by the IHS 100 discussed above with reference to FIG. 1, and/or may include some or all of the components of the IHS 100. For example, the client computing devices 204a-204n may include one or more server devices and/or other computing devices (e.g., desktop computing device(s), laptop/notebook computing device(s), tablet computing device(s), mobile phone(s), etc.) that would be apparent to one of skill in the art in possession of the present disclosure. Each of the client computing devices 204a-204n may host or otherwise provide for the execution of one or more applications whose processes utilize IPCs for facilitating communications and data sharing between the processes of the one or more applications at the client computing devices 204a-204n and/or the server computing devices 202a-202n such as, for example, Remote Procedure Call (RPC) communications, clipboard communications, data copy communications, Dynamic Data Exchange (DDE) communications, file mapping communications, mailslots communications, pipes communications, Windows® sockets communications, and other IPCs that would be apparent to one of skill in the art in possession of the present disclosure.

In an embodiment, the one or more of the applications hosted by the server computing devices 202a-202n may be accessed through the client computing devices 204a-204n to send requests and/or retrieve responses over a network 206 such as, for example, the Internet, a Local Area Network, and/or other networks known in the art, using cellular communication techniques, WiFi communication techniques, and/or other communication techniques known in the art. Furthermore, respective client computing devices 204a-204n may be coupled to one another over the network 206 to enable the applications included on the client computing devices 204a-204n to provide requests and responses for data and functions between each other. As such, in some embodiments, each of the client computing devices 204a-204n may be characterized as a server computing device as well. Similarly, each of the server computing devices 202a-202n may be coupled to one another over the network 206 to enable the applications included on the server computing devices 202a-202n to provide requests and responses for data and functions between each other. As such, in some embodiments, each of the server computing devices 202a-202n may be characterized as a client computing device as well.

The IPC system 200 also includes a broker device 208 that may be provided by the IHS 100 discussed above with reference to FIG. 1, and/or may include some or all of the components of the IHS 100. For example, the broker device 208 may include one or more computing devices (e.g., desktop computing device(s), laptop/notebook computing device(s), tablet computing device(s), mobile phone(s), etc.) that would be apparent to one of skill in the art in possession of the present disclosure. As illustrated in FIG. 2, the broker device 208 may be communicatively coupled to the server computing devices 202a-202n and client computing devices 204a-204n through the network 206. The broker device 208 may host or otherwise provide one or more broker applications that may each support the operation of one or more routing processes that provide for the routing of calls from the client computing devices 204a-204n to the server computing device 202a-202n, discussed in further detail below. In this regard, the broker device 208 may include one or more computer programs executed by one or more of the processors in the broker device 208 (e.g., using instructions on a non-transitory memory in the broker device 208) to manage receipt of requests from the client computing devices 204a-204n through the network 206, and provide those requests to the appropriate server computing devices 202a-202n based on information in those requests, as well as provide responses to those requests from the server computing devices 202a-202n to the requesting client computing devices 204a-204n. While the broker application is discussed as being hosted on a broker device 208 that is illustrated as separate from the server computing devices 202a-202n and client computing devices 204a-204n, one of skill in the art in possession of the present disclosure will recognize that the broker device 208 may be provided by any of the server computing devices 202a-202n and/or the client computing devices 204a-204n, as well as provided by a broker device 208 that provides separate instances of the broker application, and/or provided via other IPCs topologies known in the art while remaining in the scope of the present disclosure. For example. and as discussed and illustrated in FIG. 5 below, the server processes, broker processes, and the client processes may be included on a single computing device.

Figure 3:
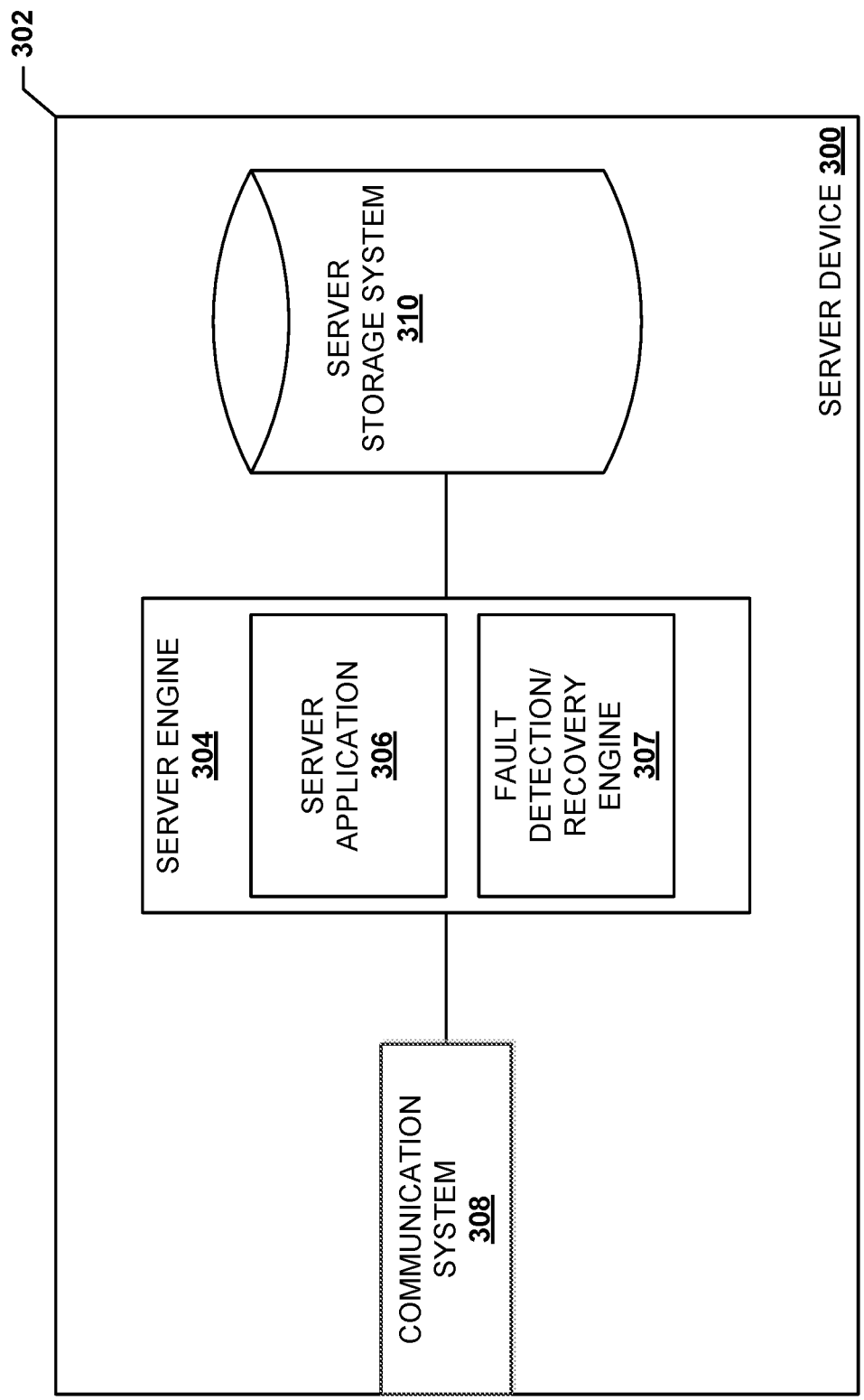
FIG. 3 is a schematic view illustrating an embodiment of a server device including a server engine used in the IPC system of FIG. 2.

Referring now to FIG. 3, an embodiment of a server computing device 300 is illustrated that may be any of the server computing devices 202a-202n discussed above with reference to FIG. 2. As such, the server computing device 300 may be provided by the IHS 100 discussed above with reference to FIG. 1 and/or may include some or all of the components of the IHS 100, and in specific embodiments may be provided by a variety of computing devices (e.g., desktop computing device(s), laptop/notebook computing device(s), tablet computing device(s), mobile phone(s), server computing device(s), etc.) that would be apparent to one of skill in the art in possession of the present disclosure. In the illustrated embodiment, the server computing device 300 includes a chassis 302 that houses the components of the server computing device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a server engine 304 that is configured to perform the functionality of the server engine, the server sub-engines, and/or the server devices discussed below.

In the illustrated embodiment, the server engine 304 includes IPC server sub-engines such as a server application 306 that is configured to process client requests and provide server responses to those client requests, as well as a fault detection and recovery engine 307 that is configured to detect faults on a communication channel between the server computing device 300 and a broker device as discussed below. The server engine 304 may also provide for the communication between the server application 306 and the broker device described below via a communication system 308 that is housed in the chassis 302, that is coupled to the server engine 304 (e.g., via a coupling between the communication system 308 and the processing system), and that may include a Network Interface Controller (NIC), a wireless communication system (e.g., a BLUETOOTH® communication system, an NFC communication system, etc.), and/or other communication components known in the art that enable the communication discussed below.

The chassis 302 may also house a storage system (which may include the storage device 108 discussed above with reference to FIG. 1) that is coupled to the server engine 304 (e.g., via a coupling between the storage system and the processing system) and that, in the illustrated embodiment, includes a server storage system 310 that is configured to store the data for IPC, development logs of error, applications, registration information, and/or any other other information, data and/or processes that one of skill in the art in possession of the present disclosure would recognize as enabling the functionality discussed below. While a specific embodiment of a server computing device 300 has been described, one of skill in the art in possession of the present disclosure will recognize that server computing devices may be provided with a variety of different components and/or component configurations that provide for conventional server device functionality, as well as the functionality discussed below, while remaining within the scope of the present disclosure.

Figure 4:
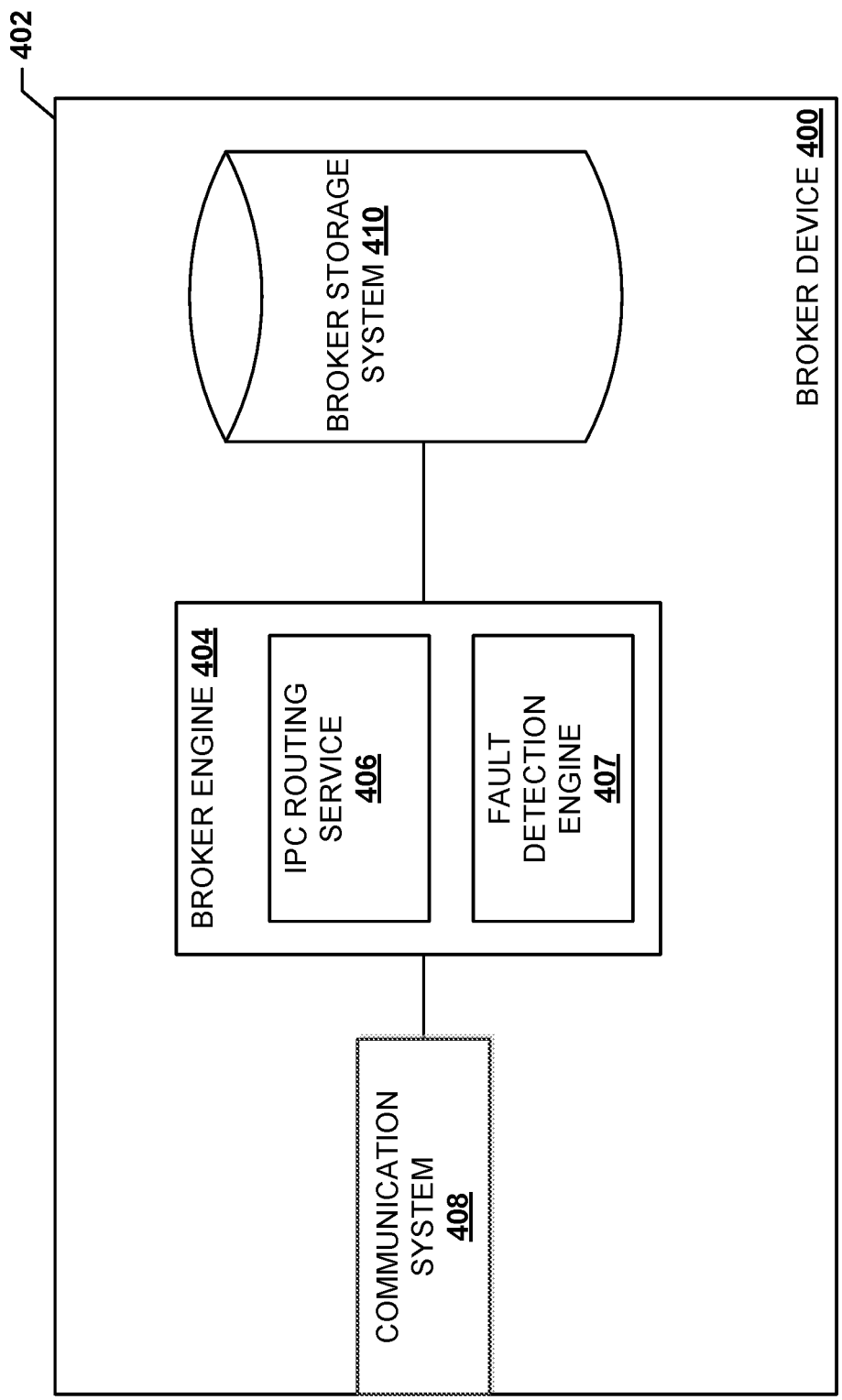
FIG. 4 is a schematic view illustrating an embodiment of a broker device including a broker engine used in the IPC system of FIG. 2.

Referring now to FIG. 4, an embodiment of a broker computing device 400 is illustrated that may be the broker device 208 discussed above with reference to FIG. 2. As such, the broker computing device 400 may be provided by the IHS 100 discussed above with reference to FIG. 1 and/or may include some or all of the components of the IHS 100, and in specific embodiments may be provided by a variety of computing devices that would be apparent to one of skill in the art in possession of the present disclosure. In the illustrated embodiment, the broker computing device 400 includes a chassis 402 that houses the components of the broker computing device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instruction that, when executed by the processing system, cause the processing system to provide a broker engine 404 that is configured to perform the functionality of the broker engines, broker sub-engines, and the broker computing devices discussed below. In the examples discussed below, the broker engine 404 includes one or more broker sub-engines that each provide an IPC routing service 406 that is configured to route requests and responses between client processes on the client computing devices 204a-204n and server processes on the server computing devices 202a-202n, as well as register server computing devices 202a-202n with the IPC routing service 406. The broker engine 404 also provides a fault detection and recovery engine 407 that is configured to detect faults associated with communication channels with server computing device 202a-202n and perform recovery operation for those communications channels, discussed in further detail below.

The chassis 402 may also house a storage system (which may include the storage device 108 discussed above with reference to FIG. 1) that is coupled to the broker engine 404 (e.g., via a coupling between the storage system and the processing system) and that, in the illustrated embodiment, includes a broker storage system 410 that is configured to provide for registration of the server computing devices 202a-202n that are managed by the IPC routing service 406, that stores routing information, and stores any of the data that one of skill in the art in possession of the present disclosure will recognize enables the functionality discussed below. The chassis 402 may also house a communication system 408 that is coupled to the broker engine 404 (e.g., via a coupling between the communication system 408 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a broker computing device 400 has been described, one of skill in the art in possession of the present disclosure will recognize that broker computing devices may be provided with a variety of different components and/or component configurations that provide for conventional broker device functionality, as well as the functionality discussed below, while remaining within the scope of the present disclosure.

Figure 5:
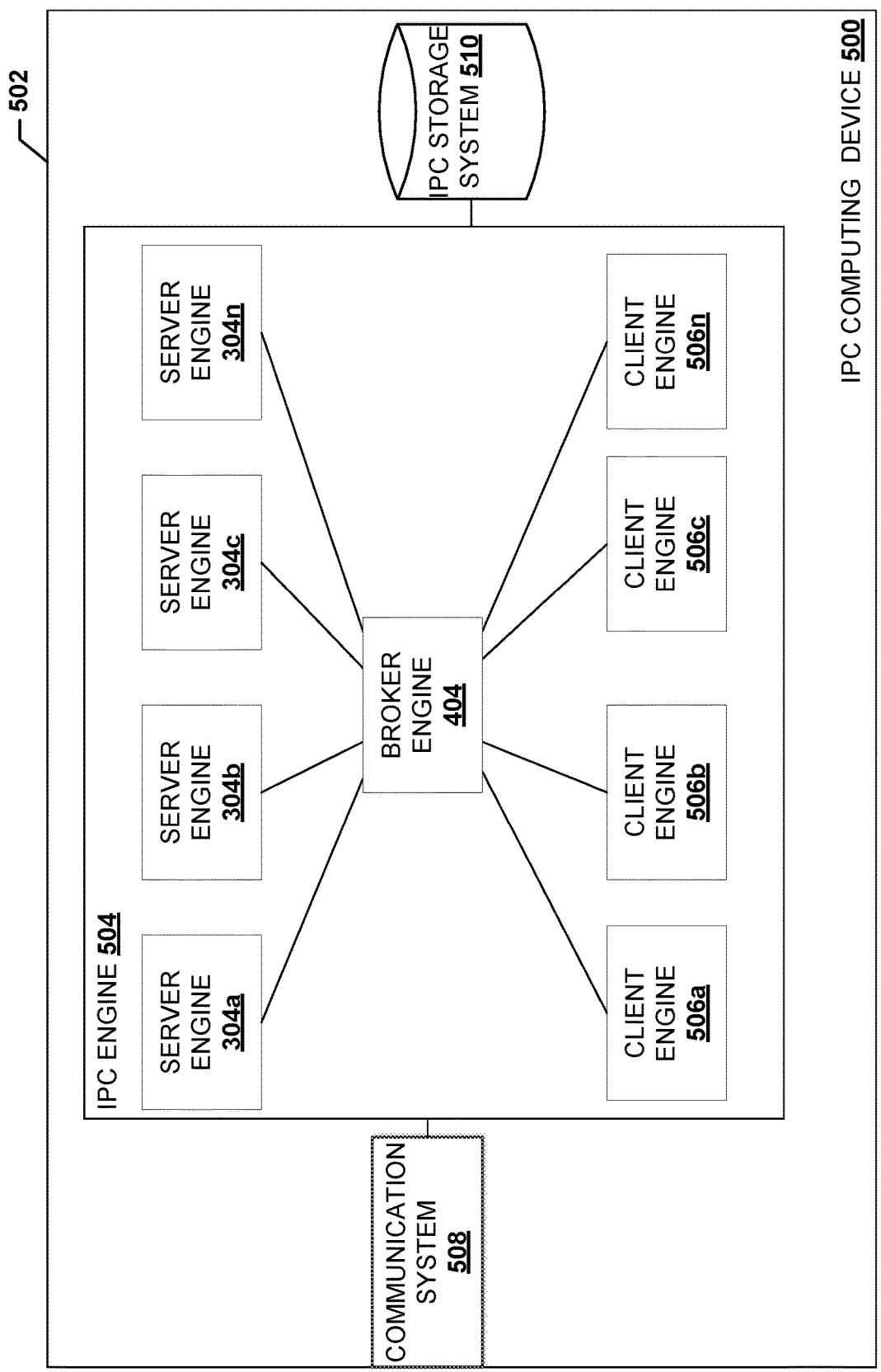
FIG. 5 is a schematic view illustrating an alternative embodiment of an IPC system provided in a computing device.

Referring now to FIG. 5, an embodiment of an IPC computing device 500 is illustrated that may be provided by the IHS 100 discussed above with reference to FIG. 1 and/or may include some or all of the components of the IHS 100, and in specific embodiments may be provided by a variety of computing device (e.g., desktop computing device(s), laptop/notebook computing device(s), tablet computing device(s), mobile phone(s), server computing device(s), etc.) that would be apparent to one of skill in the art in possession of the present disclosure. As discussed above, in some embodiments, the server processes, broker processes, and client processes that are included in the IPC system 200 and illustrated as being provided on separate server computing devices 202a-202n, a broker device 208, and separate client computing devices 204a-204n, respectively, may be processes provided by one or more applications hosted by a single computing device.

In the illustrated embodiment, the IPC computing device 500 includes a chassis 502 that houses the components of the IPC computing device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide an IPC engine 504 that is configured to perform the functionality of the IPC engines and the IPC computing devices discussed below. In the examples discussed below, the IPC engine 504 provides one or more server engines 304a, 304b, 304c, and up to 304n that may be configured similarly to the server engine 304 of FIG. 3, a broker engine 404 that may be configured similarly to the broker engine 404 of FIG. 4, and one or more client engines 506a, 506b, 506c, and up to 506n which may be client application processes that request functions and/or data from the server engines 304a-304n.

The chassis 502 may also house a storage system (which may include the storage device 108 discussed above with reference to FIG. 1) that is coupled to the IPC engine 504 (e.g., via a coupling between the storage system and the processing system) and that, in the illustrated embodiment, includes an IPC storage system 510 that is configured to store the data and the applications that are similar to those included in the server storage system 310 of FIG. 3 and/or the broker storage system 410 of FIG. 4 described above. The chassis 502 may also house a communication system 508 that is coupled to the IPC engine 504 (e.g., via a coupling between the communication system 508 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a IPC device 500 has been described, one of skill in the art in possession of the present disclosure will recognize that IPC computing devices may be provided with a variety of different components and/or component configurations that provide for conventional IPC device functionality, as well as the functionality discussed below, while remaining within the scope of the present disclosure.

Figure 6:
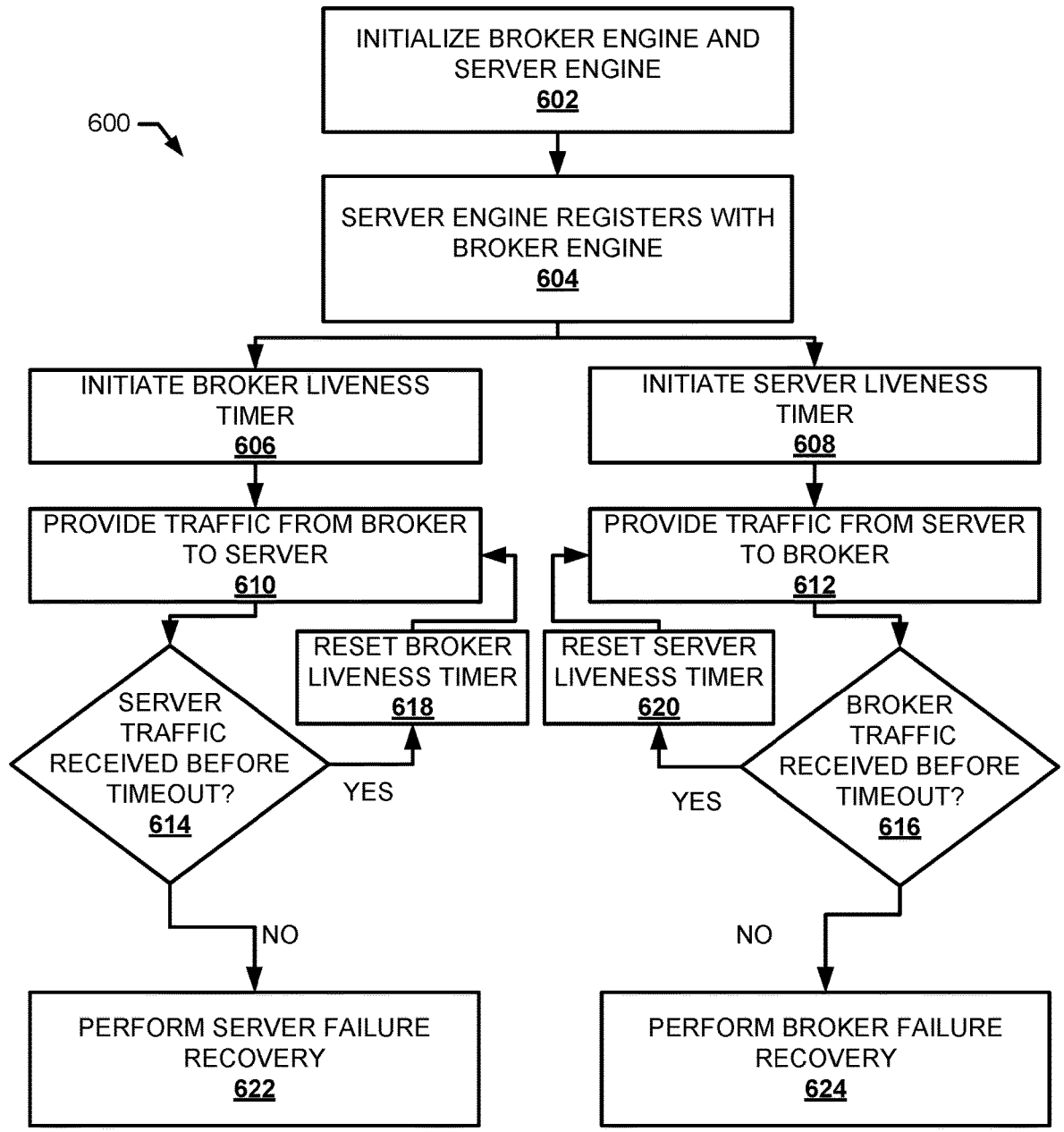
FIG. 6 is a flowchart illustrating an embodiment of a method for providing fault detection and recovery in an IPC system.
Figure 7:
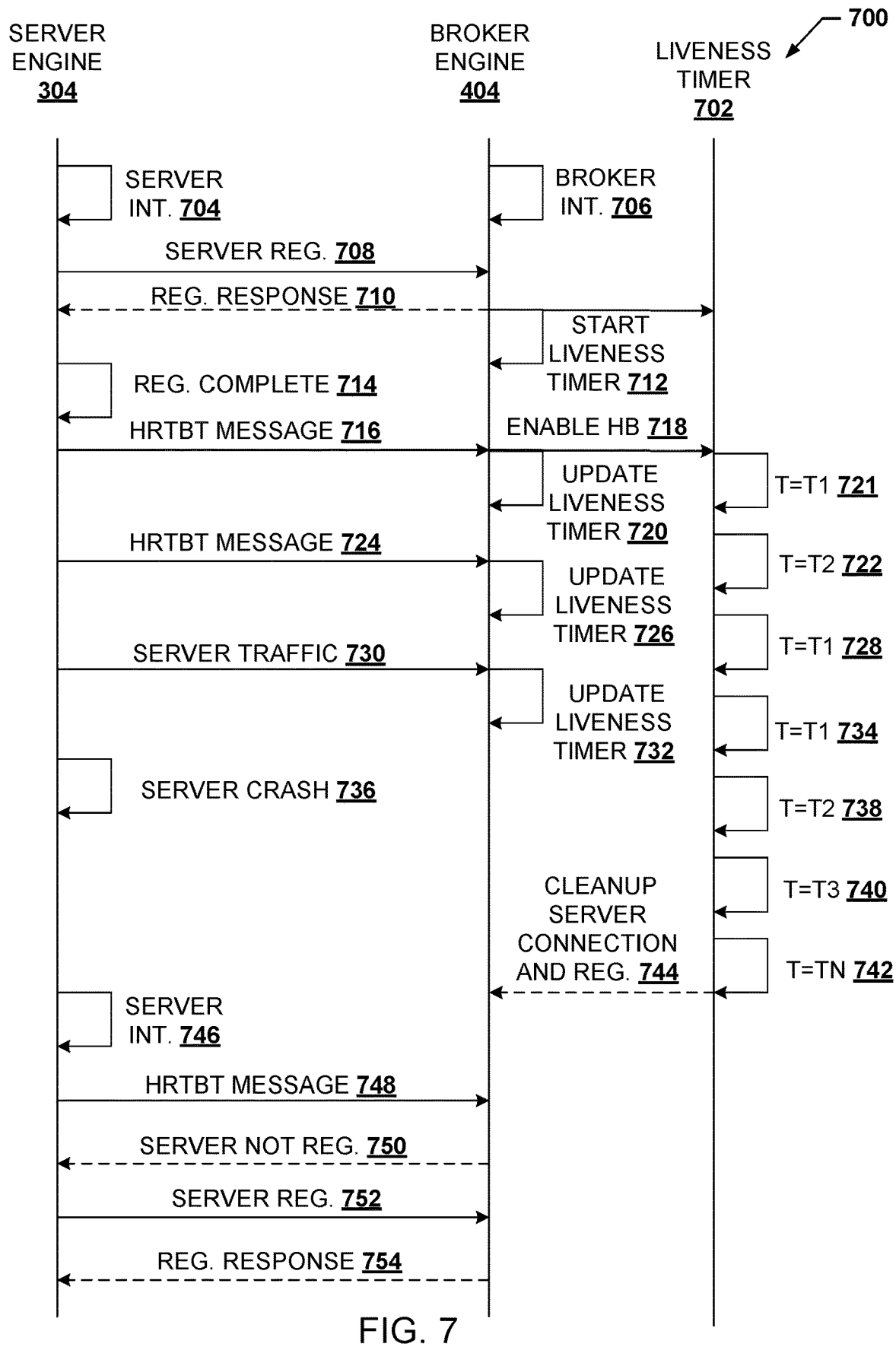
FIG. 7 is a flow diagram illustrating an embodiment the method of FIG. 6 being performed in the IPC system of FIG. 2 or FIG. 5.
Figure 8:
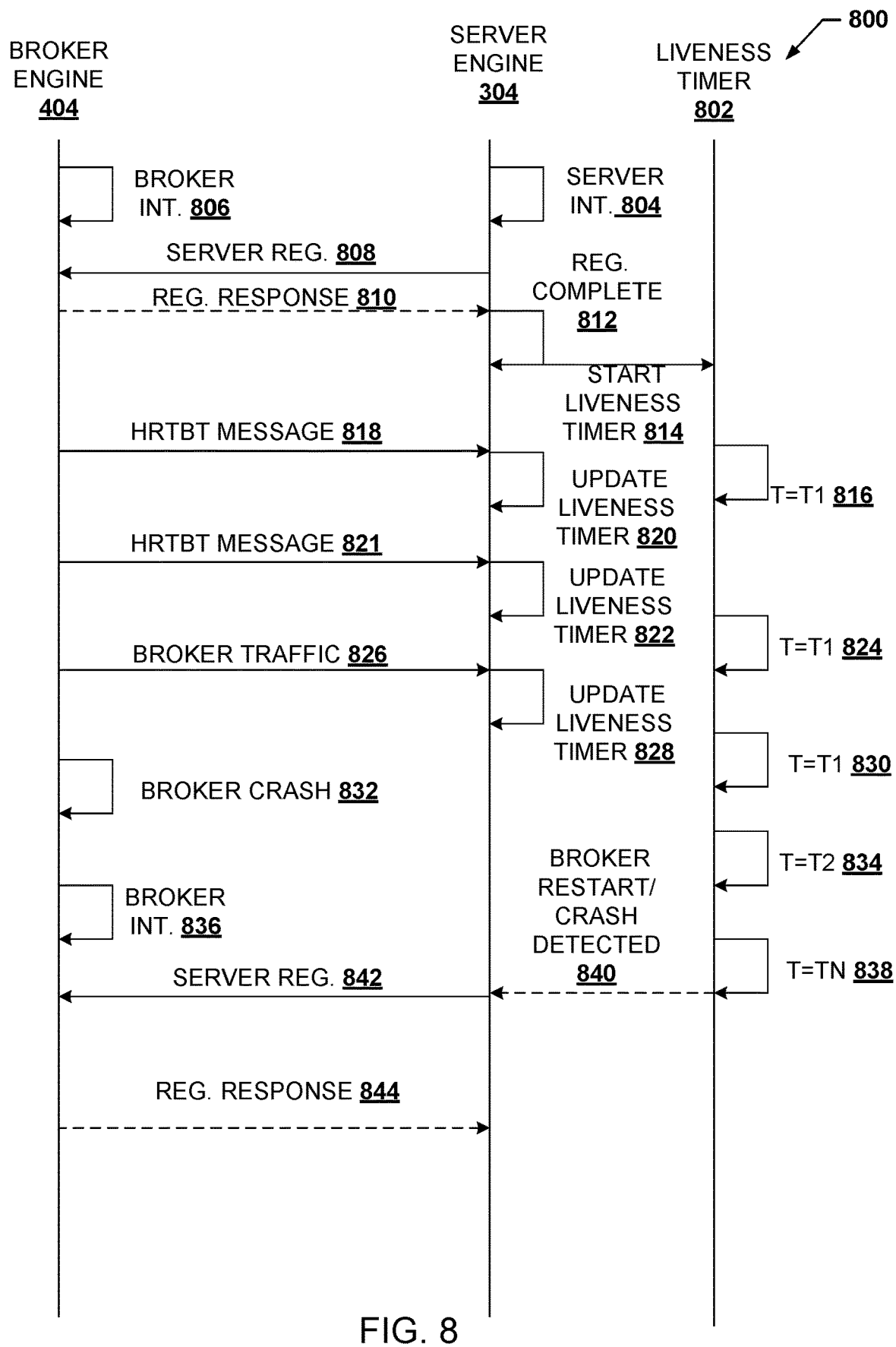
FIG. 8 is a flow diagram illustrating an embodiment the method of FIG. 6 being performed in the IPC system of FIG. 2 or FIG. 5.

Referring now to FIG. 6, and with reference to FIGS. 7 and 8, an embodiment of a method 600 for providing fault detection and recovery in an IPC system is illustrated. As discussed below, the systems and methods of the present disclosure include a server engine and a broker engine that, upon registration, are coupled to each other through a communication channel that enables client requests and server responses to those client requests to be communicated. During operation of the IPC system, a variety of faults may occur with the server engines, the broker engines, and/or devices hosting those IPC processes, and those faults may cause the entire IPC system to be affected by, for example, blocking, delaying, and/or dropping client request and server response messages. For example, faults may prevent the server engine from sending traffic or servicing client requests that have been sent to it, prevent the broker engine from sending requests to the server engine, may cause the server engine and/or the broker engine to restart or become unavailable (e.g., "crash"), and result in other fault issues and/or errors with the server engine, broker engine, and/or the communication channel.

The server engine and the broker engine of the present disclosure may be each be configured with a fault detection and recovery engine that remedies such issues. For example, a broker fault detection and recovery engine may monitor for server-to-broker heartbeat messages or other traffic from the server on the communication channel and, when detecting such messages/traffic, resetting a broker liveness timer maintained by the broker fault detection and recovery engine. When that broker liveness timer reaches a predetermined time amount (i.e., has not been reset for the predetermined time amount), the broker fault detection and recovery engine determines that the server engine is unavailable (e.g., effectively "dead"), and removes the registration of the server engine and the communication channel that couples the server engine to the broker engine.

Similarly, a server fault detection and recovery engine may monitor for broker-to-server heartbeat messages or other traffic from the broker on the communication channel and, when detecting such messages/traffic, resetting a server liveness timer maintained by the server fault detection and recovery engine. When that server liveness timer reaches a predetermined time amount (i.e., has not been reset for the predetermined time amount), the server fault detection and recovery engine may provide a registration request to the broker engine to restart a server/broker registration process. By providing the server engine and the broker engine that maintain such bidirectional heartbeat monitoring, the IPC system can provide reliable services with automatic recovery when the broker engine or one of the server engines goes down, which prevents the broker engine from being affected by a failure or restart of the service engine, prevents the server engine from being affected by a failure or restart of the broker engine, and performs automatic re-registration in the event that one of the server engine and the broker engine restarts. Furthermore, a mechanism may be provided for the broker engine to communicate with the client engines such that, if a requested server engine is down, client engine timeouts are avoided. These and a variety of other benefits of the systems and methods described herein will be apparent to one of skill in the art in possession of the present disclosure.

With reference to the flow diagram 700 in FIG. 7 and the flow diagram 800 in FIG. 8, the method 600 begins at block 602 where the broker engine and the server engine are both initialized. In an embodiment of block 602, the server engine 304 may perform a server engine initialization 704/804 or otherwise start up. Similarly, the broker engine 404 may perform a broker engine initialization 706/806 or otherwise start up. The method 600 then proceeds to block 604 where server engine registers with the broker engine. In an embodiment of block 604, the server application 306 may provide a server registration request 708/808 to the IPC routing service 406. For example, the server application 306 may provide the server registration request 708/808 on a side communication channel that is used to communicate and register the server application 306 with the IPC routing service 406, and/or perform other administrative functions that would be apparent to one of skill in the art in possession of the present disclosure. The server registration request 708/808 may include routing information such as an Internet Protocol address, a port number, client specific permissions, an IPC key, and/or other registration information that the broker engine 404 may use to establish a communication channel with the server engine 304, route client request messages, and/or perform other IPC operations. The broker engine 404 may respond with a registration response 710/810 that is provided to the server engine 304. The registration response 710/810 may include success or error information, the IPC key, and/or any other information associated with the server registration request 708/808 that would be apparent to one of skill in the art in possession of the present disclosure. Upon receiving the registration response 710/810 from the broker engine 404, the server engine 304 may complete registration 714/812.

The method 600 may then proceed to block 606, where a broker liveness timer is initiated. In an embodiment of block 606, the broker engine 404 may initiate a broker liveness timer 702 (e.g., included in the fault detection and recovery engine 407) via a start liveness timer signal 712 that may be sent upon sending the registration response 710/810 to the server engine 304. For example, the registration information provided in the server registration request 708/708 may define a predetermined time amount within which, if no traffic is received from the server engine 304, the broker engine 404 may presume that the server engine 304 has restarted, crashed, or is otherwise no longer available. However, in other examples, the predetermined time amount may be stored at the broker storage system 410 prior to the server engine 304 registering with the broker engine 404. In various embodiments, the broker liveness timer 702 may count up from an initial value to a threshold value or count down from an initial value to zero or other threshold value. The value may increase or decrease at a periodic rate (e.g., every 0.001 seconds, 0.01 seconds, 0.1 seconds, 0.5 seconds, 1 second, 2 seconds, 5 seconds or any other periodic rate). In a specific example, the count may be 6, and the values may increase from an initial value of 0 to a threshold value of 6 once per second, or decrease from an initial value of 6 to a threshold value of 0 once per second. The broker liveness timer 702 may be configured to reset to the initial value upon the broker engine 404 receiving any traffic from the server engine 304, as discussed below. In some embodiments, the broker liveness timer 702 may track a plurality of counts that are each specific to a respective server engine 304, which allows each server engine 304a-304n to be associated with a unique predetermined time amount that is monitored by the broker engine 404.

The method 600 may then proceed to block 608 where a server liveness timer is initiated. Similar to block 606, in an embodiment of block 608, the server engine 304 may initiate a server liveness timer 802 (e.g., included in the fault detection and recovery engine 307) via a start liveness timer signal 812 that is sent upon receiving the registration response 710/810 from the broker engine 404. For example, the registration information provided in the registration response 710/810 may define a predetermined time amount within which, if there is no traffic received from the broker engine 404, the server engine 304 may presume that the broker engine 404 has restarted, crashed, or is otherwise no longer available. However, in other examples, the predetermined time amount may be stored at the server storage system 310. The server liveness timer 802 may count up from an initial value to a threshold value, or count down from an initial value to zero or other threshold value. The value may increase or decrease at a periodic rate (e.g., every 0.001 seconds, 0.01 seconds, 0.1 seconds, 0.5 seconds, 1 second, 2 seconds, 5 seconds or any other periodic rate). In a specific example, the count may be 6 and the values may increase from an initial value of 0 to a threshold value of 6 once per second, or decrease from an initial value of 6 to a threshold value of 0 once per second. As discussed in further detail below, the server liveness timer 802 may be configured to reset to the initial value upon the server engine 304 receiving any traffic from the broker engine 404. In embodiment in which more than one broker engine 404 is present in the IPC system 200, the server liveness timer 802 may track a plurality of counts that are each associated with a respective broker engine 404.

The method 600 may then proceed to block 610, where the broker engine may provide traffic to the server engine in response to a successful registration with the server engine and the associated creation of the communication channel between the server engine and the broker engine. In an embodiment of block 610, the broker engine 404 may provide traffic to the server engine 304 via the communication channel established during the server registration discussed above. For example, the broker engine 404 may provide client request messages from one or more of the client engines 504a-504n (e.g., messages requesting the server application 306 of server engine 304) as the client request messages are received at the broker engine 404. However, in various examples, the broker engine 404 may not receive any client request messages for the server engine 304 over some time period. With the server liveness timer 802 initiated by the server engine 304, when the server engine 304 continues to not receive any traffic from the broker engine 404, the server liveness timer 802 will reach the predetermined time amount and cause the server engine 304 to incorrectly determine that the broker engine 404 has failed, restarted, or has otherwise become unavailable as discussed in further detail below. To prevent this, the broker engine 404 may be configured to provide broker-to-server heartbeat messages that may provide default messages to the server engine 304 that are configured to cause the server engine 304 to recognize that the broker engine 404 sent the broker-to-server heartbeat message (e.g., by including an identifier for the broker engine 404.)

In various embodiments, the registration process with the server engine 304 and/or other administrative communication on the side communication channel (or the communication channel used to provide client request messages and server response messages) may allow the broker engine 404 to learn the count threshold for the server liveness timer 802, or provide the predetermined time amount to the server liveness timer 802. The broker engine 404 may then use the predetermined time amount and the periodic rate at which the count value increases or decreases to determine an interval at which to provide the broker-to-server heartbeat messages to the server engine 304. For example, the interval at which the broker-to-server heartbeat messages are provided to the server engine 304 may be less than the threshold count for the server liveness timer 802. In various embodiments, the interval between broker-to-server heartbeat messages may be short enough such that more than one broker-to-server heartbeat message is sent to the server engine 304 before the server liveness timer 802 reaches the threshold count. For example, if the threshold count is 6 seconds, then the broker-to-server heartbeat messages may be sent every 2 seconds such that if one or more of the broker-to-server heartbeat messages does not arrive at the server engine 304, a redundant broker-to-server heartbeat message may arrive to prevent the server liveness timer 802 from reaching the predetermined time amount while the broker engine 404 is still available (which would result in the server engine 304 incorrectly determining that a fault has occurred on the broker engine 404.)

To track the interval of broker-to-server heartbeat messages, the broker engine 404 may utilize a clock associated with the broker liveness timer 702, or a broker heartbeat timer that has registered with the server liveness timer 802, that provides an alert to the broker engine 404 to provide a broker-to-server heartbeat message in the event that no other traffic (e.g., client request messages from the client engines 504a-504n) is sent to the server engine 304 during the predetermined time amount. In various embodiments, the broker engine 404 may include an incremental sequence number in each broker-to-server heartbeat message it sends to the server engine 304, and that sequence number may be used to determine which of the broker engine 404 or the server engine 304 has restarted or had experienced other faults, as discussed in further detail below.

The method 600 may also continue to block 612 (from block 608), where the server engine may provide traffic to the broker engine in response to a successful registration of the broker engine with the server engine and creation of the associated communication channel between the server engine and the broker engine. In an embodiment of block 612, the server application 306 of the server engine 304 may provide traffic to the IPC routing service 406 of the broker engine 404 via the communication channel established during the server/broker registration discussed above. For example, the server engine 304 may provide server response messages to one or more of the client engines 504a-504n requesting the server engine 304 (via the communication channel established with the broker engine 404.) However, in various situations, the server engine 304 may not receive any client request messages for the server engine 304 to process for some time period, and thus no associated traffic will be provided to the broker engine 404 via the communication channel during that time period. With the broker liveness timer 702 initiated by the broker engine 404, when the broker engine 404 continues to not receive any traffic from the server engine 304, the broker liveness timer 702 will reach the predetermined time amount and cause the broker engine 404 to determine that the server engine 304 has failed, restarted, or is otherwise unavailable, as discussed in further detail below. To prevent this, the server engine 304 may be configured to provide server-to-broker heartbeat messages (via the communication channel) that may provide default messages that are configured to cause the broker engine 404 to recognize that the server engine 304 sent the server-to-broker heartbeat message (e.g., by including an identifier for the server engine 304.)

In various embodiments, the registration process with the broker engine 404 and/or other administrative communication on the side communication channel (or the communication channel used to provide client request messages and server response message) may allow the server engine 304 to learn the predetermined time amount for the broker liveness timer 702, or provide the predetermined time amount to the broker liveness timer 702. The server engine 304 may then use the predetermined time amount and the periodic rate at which the count value increases or decreases to determine an interval at which to provide the server-to-broker heartbeat messages to the broker engine 404. The interval at which the server-to-broker heartbeat messages are provided to the broker engine 404 may be less than the threshold count for the broker liveness timer 702. In various embodiments, the interval between server-to-broker heartbeat messages may be short enough such that more than one server-to-broker heartbeat message is sent to the broker engine 404 before the broker liveness timer 702 reaches the threshold count. For example, if the threshold count is 6 seconds, then the server-to-broker heartbeat messages may be sent every 2 seconds such that if one or more of the server-to-broker heartbeat messages does not arrive at the broker engine 404, a redundant server-to-broker heartbeat message may arrive before the broker liveness timer 702 reaches the predetermined time amount while the server engine 304 is still available (which would result in the broker engine 404 incorrectly determining that a fault has occurred with the server engine 304).

To track the interval of server-to-broker heartbeat messages, the server engine 304 may utilize a clock associated with the server liveness timer 802, or a server heartbeat timer, that provides an alert the server engine 304 to provide a server-to-broker heartbeat message in the event that no other traffic (e.g., server response messages to the client engines 504a-504n) is sent to the broker engine 404 during the predetermined time amount. In various embodiments, the server engine 304 may include an incremental sequence number in each server-to-broker heartbeat message the server engine 304 sends to the broker engine 404, and that sequence number may be used to determine which of the broker engine 404 or the server engine 304 has restarted or had experienced other faults, as discussed in further detail below.

As part of the base library design for the server engines 304 and broker engine 404, server heartbeat timers and broker heartbeat timers may be registered with respective broker liveness timers and server liveness timers. As discussed above, the broker-to-server heartbeat messages and the server-to-broker heartbeat messages may be provided on the same communication channel that is used to transmit the client requests messages and server response messages between the broker engine 404 and the server engine 304. Thus, the core library design may utilize an asynchronous, non-blocking event loop running in a single thread, which allows the fault detection and recovery engines 307 and 407 to know the core event loop is properly functioning if heartbeat messages are being received. Anything that would block client request messages and server response messages would also block the processing and/or sending of heartbeat messages. The use of such non-blocking event loops ensures that the fault detection and recovery engines 307 and 407 can detect any and all conditions that would cause the server engine 304 and/or the broker engine 404 to function improperly when providing traffic between the broker engine 404 and the server engine 304

The method 600 then proceeds from block 610 to 614 where it is determined whether traffic from the server engine has been received at the broker engine before the predetermined time amount. In an embodiment of block 614, the broker engine 404 may determine whether traffic from the server engine 304 has been received. As discussed above, the broker engine 404 may determine whether any server response messages, server-to-broker heartbeat messages, and/or any other server traffic has been received via the communication channel before the broker liveness timer 702 has reached the predetermined time amount. If it is determined that the broker engine 404 has received server traffic from the server engine 304, then the method 600 proceeds to block 618 where the broker liveness timer 702 is reset to its initial value, and the broker engine 404 continues to provide traffic to the server engine 304 through the communication channel, and monitor for traffic provided by the server engine 304.

For example, as illustrated FIG. 7, the broker liveness timer 702 may have started after receiving the start liveness timer signal 712. The broker engine 404 may then receive a first server-to-broker heartbeat message 716 from the server engine 304. The broker engine 404 may then register the server-to-broker heartbeat message, which may include the predetermined time amount for the broker liveness timer 702 and/or the interval at which the server-to-broker heartbeat messages are being provided to the broker engine 404. The broker engine 404 may also perform a liveness timer update 720 in response to receiving the first server-to-broker heartbeat message 716, which resets the broker liveness timer 702 to the initial value. After the periodic rate has passed, the broker liveness timer 702 may increase the count value from the initial value to a first value 721 and, after the periodic rate has passed again, broker liveness timer 702 may increase the count value from the first value 721 to the second value 722. Subsequently, the server engine 304 may send a second server-to-broker heartbeat message 724, which may be received by the broker engine 404. The second server-to-broker heartbeat message 724 may cause the broker engine 404 to perform a liveness timer update 726, which resets the count of the broker liveness timer 702 to the initial value. The broker liveness timer 702 may count to the first value again at 728 after the periodic rate has lapsed. The broker engine 404 may then receive a server response message 730 from the server engine 304 that is provided to the broker engine 404 and destined to one of the client engines 504a-504n, which may be in response to a client request message received at the server engine 304 from one of the client engines 504a-504n. The server response message 730 may cause the broker engine 404 to perform a liveness timer update 732, which resets the broker liveness timer 702 to the initial value. In various embodiments, the server engine 304 may continually provide server-to-broker heartbeat messages to the broker engine 404 at a fixed interval even when server response messages are present. However, to reduce traffic on the communication channel and the network 206, the server response message may cause the server heartbeat timer, described above, to reset such that no server-to-broker heartbeat messages are sent until a predetermined time amount of the server heartbeat timer has been reached.

Similarly at the server engine side, the method 600 then proceeds from block 612 to 616 where it is determined whether traffic from the broker engine is received at the server engine before the predetermined time amount associated with the server liveness timer. In an embodiment of block 616, the server engine 304 may determine whether traffic from the broker engine 404 has been received. As discussed above, the server engine 304 may determine whether any client request messages, broker-to-server heartbeat messages, and/or any other broker traffic has been received over the communication channel before the server liveness timer 802 has reached the predetermined time amount. If the server engine 304 has received broker traffic from the broker engine 404, then the method 600 proceeds to block 620 where the server liveness timer 802 is reset to its initial value and the server engine 304 continues to provide traffic to the broker engine 404 through the communication channel, and monitor for traffic provided by the broker engine 404.

As illustrated in FIG. 8, the server liveness timer 802 may have initiated after receiving the start liveness timer signal 814. After a first periodic rate, the server liveness timer 802 may have increased or decreased the count from an initial value to a first value at 816. The server engine 304 may then receive a first broker-to-server heartbeat message 818 from the broker engine 404. In response, the server engine 304 may provide an liveness timer update 820, which resets the server liveness timer 802 to the initial value. Similarly, the broker engine 404 may send a second broker-to-server heartbeat message 821, which may be received by the server engine 304. The second broker-to-server heartbeat message 821 may cause the server engine 304 to provide an liveness timer update 822, which resets the server liveness timer 802 to the initial value. The server liveness timer 802 may count to the first value again at 824 after a first periodic rate has lapsed. The server engine 304 may then receive a client request message 826 from the broker engine 404 that was provided by one of the client engines 504a-504n. The client request message 826 may cause the server engine 304 to provide an liveness timer update 828, which resets the server liveness timer 802 to the initial value. In various embodiments, the broker engine 404 may continually provide broker-to-server heartbeat messages at a fixed interval to the server engine 304 even when client request messages are present. However, to reduce traffic on the communication channel and the network 206, the client request message 826 may cause the broker heartbeat timer, described above, to reset such that no broker-to-server heartbeat messages are sent until the predetermined timer value of the broker heartbeat timer has been reached.

Returning to block 614, if no server traffic is received before the broker liveness timer reaches the predetermined time amount, then the method 600 proceeds to block 622 where the broker engine determines a server engine fault has occurred and performs a server engine failure recovery. In an embodiment of block 622, the broker engine 404 may determine that a fault has occurred on the server engine 304 if the broker liveness timer 702 has reached the predetermined time amount. The broker engine 404 may then initiate a server fault recovery procedure for automatic recovery. For example, subsequent to the broker liveness timer 702 reaching the predetermined time amount, the broker engine 404 may remove the registration of the server engine 304 and remove the communication channel between the server engine 304 and the broker engine 404. Furthermore, the broker engine 404 may provide a notification of the server engine fault to the client engines 504a-504n, which may be configured to prevent the client engines 504a-504n from sending requests to the broker engine 404 for services provided by that server engine 304 that is experiencing a fault. This notification may operate to prevent or reduce client engine time outs.

In various embodiments such as, for example, when the server engine 304 reboots, the server engine 304 may provide a server registration message to the broker engine 404 to re-register the server engine 304 with the broker engine 404 similarly as discussed above with reference to block 604. In other embodiments, the broker engine 404 may receive a server-to-broker heartbeat message from the server engine 304 after the fault has been detected and the broker engine 404 has removed the registration and removed the communication channel with the server engine 304. In an example, the server engine 304 may send the server-to-broker heartbeat message in response to rebooting. In another example, the server engine 304 may send the server-to-broker heartbeat message because the server engine 304 has not failed, and has not received an indication that the server engine 304 is no longer registered with the broker engine 404, which could be due to the broker engine 404 restarting, failing, or initializing for the first time. In response to receiving the server-to-broker heartbeat message subsequent to the broker engine 404 removing the registration and removing the communication channel with the server engine 304, the broker engine 404 may provide a non-registered message back to the server engine 304. The non-registered message may include the sequence number of the last server-to-broker heartbeat message received by the broker engine 404, and/or the sequence number of the last broker-to-server heartbeat message sent from the broker engine 404.

In response to receiving the non-registered message, the server engine 304 may proceed with the registration process again in a similar manner as discussed in block 604, and may determine that one of several possible conditions have occurred (e.g., based on the sequence numbers of the broker-to-server heartbeat message and/or the server-to-broker heartbeat message in the non-registered message, and the sequence numbers of the broker-to-server heartbeat message and/or the server-to-broker heartbeat message tracked by the server engine 304.) For example, the broker engine 404 may have restarted (possibly after a broker crash), and the server engine 304 may then operate to re-register with the broker engine 404 similarly as discussed above in block 604 of method 600. If the server engine 304 receives a non-registered message from the broker engine 404 and the sequence number of server-to-broker heartbeat message in the non-registered message is less than the sequence number of the most recent server-to-broker heartbeat message sent by the server engine 304, then the server engine 304 may determine that the broker engine 404 has restarted and the server engine 304 can re-register with the broker engine 404 without logging the re-registration (e.g., in a developmental log stored in the server storage system 310 and used by an administrator to resolve errors.) In another situation, if the server engine 304 receives a non-registered message from the broker engine 404 and the sequence number of server-to-broker heartbeat message in the non-registered message is greater than zero and the server engine 304 sequence number is 0, then the server engine 304 may determine that the server engine 304 restarted, and may proceed with re-registering with the broker engine 404 similarly as discussed above with reference to block 604.

As illustrated in the example of FIG. 7, the broker liveness timer 702 may have increased its count from the initial value to the first value at 734 after receiving the server response message 730 from the server engine 304. Subsequently, a server engine crash 736 occurs. While a server engine crash 736 is illustrated, other faults may occur at 736 such as, for example, a restart of the server engine 304, a shut down of the server engine 304, an unavailability of the communication channel between the server engine 304 and the broker engine 404, and/or other server engine faults or broker engine faults that would be apparent to one of skill in the art in possession of the present disclosure. In response to the crashing of the server engine 304 at 736, the broker liveness timer may continue to increase or decrease at the periodic rate such that the broker liveness timer 702 may reach a second value 738, a third value 740, and up to the value 742 of the predetermined time amount. Subsequent to reaching the predetermined time amount, the broker engine 404 may remove the server engine 304 registration and remove the communication channel between the server engine 304 and the broker engine 404. The server engine 304 may initialize at 746 and provide a server-to-broker heartbeat message 748 to the broker engine 404. The broker engine 404 may respond with a non-registered message 750 that is provided to the server engine 304. The server engine 304 may then send a server registration message 752, which may include the server engine routing information as discussed above, and the broker engine 404 may respond with a registration response message 754 after it has re-registered the server engine 304 and established the communication channel between the server engine 304 and the broker engine 404.

Returning to block 616, if no broker traffic is received before the server liveness timer reaches the predetermined time amount, then the method 600 proceeds to block 624 where the server engine determines a broker engine fault has occurred, and performs a broker engine failure recovery. In an embodiment of block 624, the server engine 304 may determine that a fault has occurred on the broker engine 404 if the server liveness timer 802 has reached the predetermined time amount. The server engine 304 may then initiate a broker fault recovery procedure for automatic recovery. For example, subsequent to the server liveness timer 802 reaching the predetermined time amount, the server engine 304 may continue sending server-to-broker heartbeat messages until it receives a non-registered message from the broker engine 404, or the server engine 304 may send a server registration message to the broker engine 404 assuming that the broker engine 404 has restarted and thus the registration has been removed by the broker engine 404.

In another example, if the broker engine 404 receives the server registration message and the broker engine 404 determines that the server engine 304 is not registered, then the broker engine 404 may register the server engine 304, establish the communication channel between the server engine 304 and the broker engine 404, and send a registration response message to the server engine 304. If the broker engine 404 receives the server registration message and the broker engine 404 determines that there is an existing registration of the server engine 304, the broker engine 404 may remove the registration and the communication channel with the server engine 304 and provide a non-registered message back to the server engine. The non-registered message may include the sequence number of the last server-to-broker heartbeat message received by the broker engine 404 and/or the last broker-to-server heartbeat message provided to server engine 304 from the broker engine 404. If the server engine 304 receives the non-registered message after the server engine 304 has provided the server registration message and the sequence number of the broker-to-server heartbeat message in the non-registered message is greater than the sequence number of the last broker-to-server heartbeat message that the server engine 304 has recorded, then the server engine 304 may determine that it has not processed broker-to-server heartbeat messages or other broker traffic properly, which may cause the server engine 304 to determine that it is experiencing a programming error (which may then be logged in the development logs stored in the server storage system 310.)

As illustrated in the example of FIG. 8, the server liveness timer 802 may have increased from the initial value to the first value at 830 after receiving the client request message 826 from the broker engine 404. Subsequently, a broker engine crash 832 occurs. While a broker engine crash 832 is illustrated, other faults may occur at 832 such as a restart of the broker engine 404, a shut down of the broker engine 404, an unavailability of the communication channel between the server engine 304 and the broker engine 404, incorrect processing of the broker-to-server heartbeat messages by the server engine 304, and/or other broker engine faults or broker engine faults that would be apparent to one of skill in the art in possession of the present disclosure. In response to crashing of the broker engine 404 at 832, the server liveness timer 802 may continue to increase or decrease at the periodic rate such that the server liveness timer 802 may reach a second value 834. The broker engine 836 may then reinitialize at 836 and, because the broker engine 404 has restarted, all of the registration and communication channels with the broker engine may be removed. As such, in such a scenario, the broker engine 404 will no longer be sending broker-to-server heartbeat messages to the server engine 304, and the server liveness timer 802 will reach the value 838 of the predetermined time amount.

Subsequent to reaching the predetermined time amount, the server engine 304 may detect the broker engine 404 fault at 840, and may provide a server registration message at 842 to the broker engine 404. The broker engine 404 may respond with a registration response message 844 after the broker engine 404 registers the server engine 304 and establishes the communication channel. As discussed above, after determining that the predetermined time amount has been reached, the server engine 304 may provide a server-to-broker heartbeat message to the broker engine 404, which may respond with a non-registered message that may include the sequence number of the last broker-to-server heartbeat message provided by the broker engine 404 and/or the last server-to-broker heartbeat message received by the broker engine 404 from the server engine 304. Based on the sequence number of the broker-to-server heartbeat message and/or the server-to-broker heartbeat message received in the non-registered message, and the broker-to-server heartbeat message and/or the server-to-broker heartbeat message tracked by the server engine 304, the server engine 304 may determine whether the fault was at the server engine 304 or at the broker engine 404, and may provide a notification to an administrator or log an error in a developmental log based on the fault.

Thus, systems and methods have been described that provide for fault detection and recovery in an IPC system. A broker engine and a server engine of the IPC system may maintain bidirectional heartbeating on a communication channel that provides for traffic between the broker and the server, which provides reliable services with automatic recovery when a broker engine or server engine goes down, which prevents the broker from being affected by a crash or restart of the service engine, and prevents the server engine from being affected by a crash or restart of the broker engine. The IPC system provides for the automatic re-registration of the server engine with the broker engine in the event that one of the server engine and the broker engine restarts, and a mechanism for the broker to communicate with the client engines to prevent client timeouts in the event a requested server engine is unavailable. As such, a server engine does not need to restart due to a failure of the broker engine in order to re-register the server engine with the broker engine, which provides benefits over traditional IPC systems that utilize hardware or system watchdogs that require such restarts. These as well as a variety of other benefits will be apparent to one of skill in the art in possession of the present disclosure Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An inter-process communication (IPC) system comprising an Information Handling System (IHS) comprising a communication system, a processing system coupled to the communication system, and a memory system coupled to the processing system, the IHS being configured to implement:
 a first client engine;
 a first server engine; and
 a broker engine that is coupled to the first client engine, wherein the broker engine is configured to:
  initiate a first timer that is configured to reset when traffic is received from the first server engine while the first server engine is registered with the broker engine and coupled to the broker engine via a communication channel, wherein the traffic that causes the first timer to reset includes at least one of: traffic generated by the first client engine to complete a request, and a first server-to-broker heartbeat message generated by the first server engine; and
  determine that the first timer has reached a predefined time amount, and in response, remove the registration of the first server engine and remove the communication channel between the broker engine and the first server engine;
  provide, to the first server engine, a broker-to-server heartbeat message while the first server engine is registered with the broker engine and the communication channel is established;

wherein the first server engine is configured to:
   initiate a second timer that is configured to reset when traffic is received from the broker engine while the broker engine is registered with the first server engine and coupled to the first server engine via the communication channel, wherein the traffic that causes the second timer to reset includes at least one of: a request generated by the first client engine, and the broker-to-server heartbeat message provided by the broker engine; and
   determine that the second timer has reached a predefined time amount and, in response, provide a registration request to the broker engine.

2. The IPC system of claim 1, wherein at least one of the broker-to-server heartbeat message and the first server-to-broker heartbeat message includes a sequence number, and wherein the first server engine is configured to utilize the sequence number to determine whether the broker engine has failed, and wherein the broker engine is configured to utilize the sequence number to determine whether the first server engine has failed.

3. The IPC system of claim 1, wherein the broker engine is further configured to:
   receive a second server-to-broker heartbeat message subsequent to removing the registration of the first server engine and removing the communication channel and, in response, provide a not-registered message to the first server engine; and
   receive a registration request from the first server engine and, in response, re-register the first server engine and reestablish the communication channel between the first server engine and the broker engine.

4. The IPC system of claim 1, wherein the broker engine is configured to:
   provide, to the first client engine in response to receiving a client request and the first timer reaching the predefined time amount, a notification that the first server engine is unavailable.

5. The IPC system of claim 1, wherein the first server-to-broker heartbeat message is generated by the first server engine when the traffic generated by the first client engine to complete the request is not received by the broker engine for a predefined time period.

6. An information handling system (IHS), comprising:
   a communication system;
   a processing system coupled to the communication system; and
   a memory system coupled to the processing system and including instructions that, when executed by the processing system, cause the processing system to provide a broker engine that is configured to:
      initiate a first timer that is configured to reset when traffic is received from a first server engine while the first server engine is registered with the broker engine and coupled to the broker engine via a communication channel provided by the communication system, wherein the traffic that causes the first timer to reset includes at least one of: traffic generated by a first client engine coupled to the broker engine through the communication system to complete a request, and a first server-to-broker heartbeat message generated by the first server engine;
      determine that the first timer has reached a predefined time amount, and in response, remove the registration of the first server engine and remove the communication channel between the broker engine and the first server engine;
      provide, to the first server engine via the communication system, a broker-to-server heartbeat message while the first server engine is registered with the broker engine and the communication channel is established;
      receive, from the first server engine, a registration request, wherein the registration request is received in response to the first server engine initiating a second timer that is configured to reset when traffic is received from the broker engine while the broker engine is registered with the first server engine and coupled to the first server engine via the communication channel provided by the communication system, wherein the traffic that causes the second timer to reset includes at least one of: a request generated by the first client engine, and the broker-to-server heartbeat message provided by the broker engine, and determining that the second timer has reached a predefined time amount and, in response, providing a registration request to the broker engine.

7. The IHS of claim 6, wherein at least one of the broker-to-server heartbeat message and the first server-to-broker heartbeat message includes a sequence number, and wherein the first server engine is configured to utilize the sequence number to determine whether the broker engine has failed, and wherein the broker engine is configured to utilize the sequence number to determine whether the first server engine has failed.

8. The IHS of claim 6, wherein the broker engine is further configured to:
   receive a second server-to-broker heartbeat message subsequent to removing the registration of the first server engine and removing the communication channel and, in response, provide a not-registered message to the first server engine; and
   receive a registration request from the first server engine and, in response, re-register the first server engine and reestablish the communication channel between the first server engine and the broker engine.

9. The IHS of claim 6, wherein the broker engine is configured to:
   provide, to the first client engine in response to receiving a client request and the first timer reaching the predefined time amount, a notification that the first server engine is unavailable.

10. The IHS of claim 6, wherein the first server-to-broker heartbeat message is generated by the first server engine when the traffic generated by the first client engine to complete the request is not received by the broker engine for a predefined time period.

11. A method of fault detection in an inter-process communication system, comprising:
   initiating, by a broker engine, a first timer that is configured to reset when traffic is received from a first server engine coupled to the broker engine while the first server engine is registered with the broker engine and coupled to the broker engine via a communication channel, wherein the traffic that causes the first timer to reset includes at least one of: traffic generated by a first client engine coupled to the broker engine to complete a request, and a first server-to-broker heartbeat message generated by the first server engine;
   determining, by the broker engine, that the first timer has reached a predefined time amount, and in response, remove the registration of the first server engine and remove the communication channel between the broker engine and the first server engine;

providing, by the broker engine to the first server engine, a broker-to-server heartbeat message while the first server engine is registered with the broker engine and the communication channel is established;

receiving, by the broker engine, registration request, wherein the registration request is provided to the broker engine by the first server engine in response to the first server engine initiating a second timer that is configured to reset when traffic is received from the broker engine while the broker engine is registered with the first server engine and coupled to the first server engine via the communication channel, wherein the traffic that causes the second timer to reset includes at least one of: a request generated by the first client engine, and the broker-to-server heartbeat message provided by the broker engine, and the first server engine determining that the second timer has reached a predefined time amount.

12. The method of claim 11, wherein at least one of the broker-to-server heartbeat message and the first server-to-broker heartbeat message includes a sequence number, and wherein the first server engine is configured to utilize the sequence number to determine whether the broker engine has failed, and wherein the broker engine is configured to utilize the sequence number to determine whether the first server engine has failed.

13. The method of claim 11, further comprising:

receiving, by the broker engine, a second server-to-broker heartbeat message subsequent to removing the registration of the first server engine and removing the communication channel and, in response, provide a not-registered message to the first server engine; and receiving, by the broker engine, a registration request from the first server engine and, in response, re-register the first server engine and reestablish the communication channel between the first server engine and the broker engine.

14. The method of claim 11, further comprising:

providing, by the broker engine to the first client engine in response to receiving a client request and the first timer reaching the predefined time amount, a notification that the first server engine is unavailable.

\* \* \* \* \*